United States Patent
Risucci

(10) Patent No.: US 7,107,439 B2
(45) Date of Patent: Sep. 12, 2006

(54) SYSTEM AND METHOD OF CONTROLLING SOFTWARE DECOMPRESSION THROUGH EXCEPTIONS

(75) Inventor: Christopher R. Risucci, Santa Clara, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 614 days.

(21) Appl. No.: 09/925,314

(22) Filed: Aug. 10, 2001

(65) Prior Publication Data

US 2003/0041231 A1 Feb. 27, 2003

(51) Int. Cl.
*G06F 9/00* (2006.01)

(52) U.S. Cl. .......................... 712/244; 712/211

(58) Field of Classification Search ............... 712/244, 712/204, 205, 211, 35; 710/260, 261
See application file for complete search history.

(56) References Cited

U.S. PATENT DOCUMENTS

| | | | |
|---|---|---|---|
| 3,543,245 A | 11/1970 | Nutter | |
| 3,631,405 A | 12/1971 | Hoff et al. | |
| 3,794,980 A | 2/1974 | Cogar et al. | |
| 3,811,114 A | 5/1974 | Lemay et al. | |
| 3,840,861 A | 10/1974 | Amdahl et al. | |
| 3,949,372 A | 4/1976 | Brioschi | |
| 3,983,541 A | 9/1976 | Faber et al. | |
| 4,068,303 A | 1/1978 | Morita | |
| 4,077,058 A | 2/1978 | Appell et al. | |
| 4,084,235 A | 4/1978 | Hirtle et al. | |
| 4,110,822 A | 8/1978 | Porter et al. | |
| 4,149,244 A | 4/1979 | Anderson et al. | |
| 4,229,790 A | 10/1980 | Gilliland et al. | |
| 4,274,138 A | 6/1981 | Shimokawa | |

(Continued)

FOREIGN PATENT DOCUMENTS

| | | |
|---|---|---|
| CA | 990394 | 6/1976 |
| EP | 0 073 424 A2 | 3/1983 |
| EP | 0 109 567 A2 | 5/1984 |

(Continued)

OTHER PUBLICATIONS

Bandyopadhyay, A. and Zheng, Y.F., "Combining Both Micro–Code And Hardwired Control In RISC," 5 pages, (published in ACM SIGARCH Computer Architecture News, vol. 15, Issue 4, pp. 11–15 (Sep. 1987)).

(Continued)

*Primary Examiner*—Henry W. H. Tsai
(74) *Attorney, Agent, or Firm*—Sterne, Kessler, Goldstein & Fox P.L.L.C.

(57) ABSTRACT

When processor instructions are required for execution, a misaligned address is sent to the processor. The misaligned instruction address causes a computer processor exception. The computer system automatically executes an exception handling routine that transforms data into at least one executable instruction for the processor. In embodiments, data is transformed by decompressing a compressed instruction, decrypting an encrypted instruction, decoding a macro instruction, or transforming a non-native instruction into at least one instruction.

24 Claims, 6 Drawing Sheets

U.S. PATENT DOCUMENTS

| | | |
|---|---|---|
| 4,285,040 A | 8/1981 | Carlson et al. |
| 4,295,193 A | 10/1981 | Pomerene |
| 4,432,056 A | 2/1984 | Aimura |
| 4,456,954 A | 6/1984 | Bullions, III et al. |
| 4,463,342 A | 7/1984 | Langdon, Jr. et al. |
| 4,467,409 A | 8/1984 | Potash et al. |
| 4,488,143 A | 12/1984 | Martin |
| 4,507,728 A | 3/1985 | Sakamoto et al. |
| 4,575,797 A | 3/1986 | Gruner et al. |
| 4,603,399 A | 7/1986 | Cheek et al. |
| 4,685,080 A | 8/1987 | Rhodes, Jr. et al. |
| 4,724,517 A | 2/1988 | May |
| 4,727,480 A | 2/1988 | Albright et al. |
| 4,774,652 A | 9/1988 | Dhuey et al. |
| 4,777,594 A | 10/1988 | Jones et al. |
| 4,782,441 A | 11/1988 | Inagami et al. |
| 4,782,443 A | 11/1988 | Matsumoto |
| 4,799,242 A | 1/1989 | Vermeulen |
| 4,802,119 A | 1/1989 | Heene et al. |
| 4,814,975 A | 3/1989 | Hirosawa et al. |
| 4,835,734 A | 5/1989 | Kodaira et al. |
| 4,839,797 A | 6/1989 | Katori et al. |
| 4,868,740 A | 9/1989 | Kagimasa et al. |
| 4,876,639 A | 10/1989 | Mensch, Jr. |
| 4,992,934 A | 2/1991 | Portanova et al. |
| 5,031,096 A | 7/1991 | Jen et al. |
| 5,091,846 A | 2/1992 | Sachs et al. |
| 5,115,500 A | 5/1992 | Larsen |
| 5,132,898 A | 7/1992 | Sakamura et al. |
| 5,193,158 A | 3/1993 | Kinney et al. |
| 5,241,636 A | 8/1993 | Kohn |
| 5,241,679 A | 8/1993 | Nakagawa et al. |
| 5,255,379 A | 10/1993 | Melo |
| 5,280,593 A | 1/1994 | Bullions, III et al. |
| 5,307,504 A | 4/1994 | Robinson et al. |
| 5,327,566 A | 7/1994 | Forsyth |
| 5,335,331 A | 8/1994 | Murao et al. |
| 5,339,422 A | 8/1994 | Brender et al. |
| 5,355,460 A | 10/1994 | Eickemeyer et al. |
| 5,420,992 A | 5/1995 | Killian et al. |
| 5,430,862 A | 7/1995 | Smith et al. |
| 5,438,668 A | 8/1995 | Coon et al. |
| 5,438,672 A | 8/1995 | Dey |
| 5,463,700 A | 10/1995 | Nakazawa |
| 5,467,134 A | 11/1995 | Laney et al. |
| 5,481,684 A | 1/1996 | Richter et al. |
| 5,481,693 A | 1/1996 | Blomgren et al. |
| 5,506,974 A | 4/1996 | Church et al. |
| 5,517,664 A | 5/1996 | Watanabe et al. |
| 5,519,873 A | 5/1996 | Butter et al. |
| 5,522,086 A | 5/1996 | Burton et al. |
| 5,542,059 A | 7/1996 | Blomgren |
| 5,546,552 A * | 8/1996 | Coon et al. .................. 712/209 |
| 5,568,646 A | 10/1996 | Jaggar |
| 5,574,873 A | 11/1996 | Davidian |
| 5,574,887 A | 11/1996 | Fitch |
| 5,574,927 A | 11/1996 | Scantlin |
| 5,574,928 A | 11/1996 | White et al. |
| 5,577,200 A | 11/1996 | Abramson et al. |
| 5,598,546 A | 1/1997 | Blomgren |
| 5,619,665 A | 4/1997 | Emma |
| 5,619,666 A | 4/1997 | Coon et al. |
| 5,632,024 A | 5/1997 | Yajima et al. |
| 5,638,525 A | 6/1997 | Hammond et al. |
| 5,652,852 A | 7/1997 | Yokota |
| 5,685,009 A | 11/1997 | Blomgren et al. |
| 5,732,234 A | 3/1998 | Vassiliadis et al. |
| 5,740,461 A | 4/1998 | Jaggar |
| 5,745,058 A | 4/1998 | Auerbach et al. |
| 5,751,932 A * | 5/1998 | Horst et al. .................. 714/12 |
| 5,758,115 A | 5/1998 | Nevill |
| 5,764,994 A | 6/1998 | Craft |
| 5,774,686 A | 6/1998 | Hammond et al. |
| 5,781,750 A | 7/1998 | Blomgren et al. |
| 5,794,010 A | 8/1998 | Worrell et al. |
| 5,796,973 A | 8/1998 | Witt et al. |
| 5,828,859 A | 10/1998 | Tanihira et al. |
| 5,829,012 A | 10/1998 | Marlan et al. |
| 5,854,913 A | 12/1998 | Goetz et al. |
| 5,867,681 A | 2/1999 | Worrell et al. |
| 5,867,682 A | 2/1999 | Witt et al. |
| 5,896,519 A | 4/1999 | Worrell |
| 5,905,893 A | 5/1999 | Worrell |
| 5,948,112 A * | 9/1999 | Shimada et al. .............. 714/16 |
| 5,954,830 A | 9/1999 | Ternullo, Jr. |
| 5,982,459 A * | 11/1999 | Fandrianto et al. ....... 348/425.3 |
| 6,012,138 A | 1/2000 | Worrell |
| 6,021,265 A | 2/2000 | Nevill |
| 6,212,630 B1 | 4/2001 | Takayama et al. |
| 6,219,774 B1 | 4/2001 | Hammond et al. |
| 6,266,765 B1 | 7/2001 | Horst |
| 6,272,620 B1 | 8/2001 | Kawasaki et al. |
| 6,631,460 B1 | 10/2003 | Morris et al. |
| 6,651,160 B1 | 11/2003 | Hays |
| 2001/0021970 A1 | 9/2001 | Hotta et al. |
| 2002/0138213 A1 | 9/2002 | Minematsu |
| 2002/0144041 A1 * | 10/2002 | Revilla et al. .............. 710/260 |
| 2004/0054872 A1 | 3/2004 | Nguyen et a l. |

FOREIGN PATENT DOCUMENTS

| | | |
|---|---|---|
| EP | 0 169 565 A2 | 1/1986 |
| EP | 0 199 173 A2 | 10/1986 |
| EP | 0 199 173 A3 | 10/1986 |
| EP | 0 264 215 A2 | 4/1988 |
| EP | 0 272 198 A2 | 6/1988 |
| EP | 0 272 198 A3 | 6/1988 |
| EP | 0 324 308 A3 | 7/1989 |
| EP | 0 324 308 A2 | 7/1989 |
| EP | 0 239 081 B1 | 9/1995 |
| EP | 0 449 661 B1 | 11/1995 |
| EP | 0 368 332 B1 | 9/1997 |
| GB | 2 016 755 A | 9/1979 |
| GB | 2 284 492 A | 6/1995 |
| GB | 2 289 353 A | 11/1995 |
| GB | 2 290 395 A | 12/1995 |
| WO | 95/30187 | 11/1995 |
| WO | 95/30188 | 11/1995 |
| WO | 96/24895 | 8/1996 |

OTHER PUBLICATIONS

Bursky, D., "Software–Efficient RISC Core Trims System–Memory Needs," Reprinted from Electronic Design, Penton Publishing, Inc., 3 pages (Mar. 20, 1995).

Hayashi, T. et al., "A 5.6–MIPS Call–Handling Processor for Switching Systems," IEEE Journal of Solid–State Circuits, vol. 24, No. 4, IEEE, pp. 945–950 (Aug. 1989).

"High Performance Dual Architecture Processor," IBM Technical Disclosure Bulletin, vol. 36, No. 2, IBM Corp., pp. 231–234 (Feb. 1993).

Intel486TM Microprocessor Family Programmer's Reference Manual, Intel Corporation, 1992, pp. 23–25, 23–26, and 23–29.

McNeley, K.J. and Milutinovic, V.M., "Emulating a Complex Instruction Set Computer with a Reduced Instruction Set Computer," IEEE Micro, IEEE, pp. 60–72 (Feb. 1987).

"LSI Tiny Risc development," http://www.redhat.com/support/manuals/gnupro99r1/6_embed/emb09.html, 13 pages (Apr. 2001).

$V_R$4121™ 64/32–Bit Microprocessor µPD30121, NEC Corporation 1998, Document No. U13569EJ4V1UM00 (4$^{th}$ edition), pp. 1–19 and 103–131, Published Jul. 2000.

MIPS Technologies Licenses MIPS64™ 5Kf™ and MIPS32™ 4KEc™ Processor Cores to LSI Logic, from http://www.mips.com/pressReleases/061101C.html, MIPS Technologies, Inc., 3 pages (Jun. 11, 2001).

Sweetman, D., See MIPS Run, Morgan Kaufmann Publishers, Inc., ISBN 1–55860–140–3, pp. vii–xiv, 91–101, 369–386 and 423–425 (1999).

Turley, J., "LSI's TinyRisc Core Shrinks Code Size: Code–Compaction Technique Squeezes MIPS Instructions Into 16 Bits," Microprocessor Report, Microdesign Resources, pp. 40–43 (Oct. 28, 1996).

LSI Logic announces world's highest–performing 64–bit MIPS embedded microprocessor core: Two new MIPS–based EasyMACRO ASIC cores offer size, speed and performance advantages for a broad range of applications, from http://www.lsilogic.com/news/product_news/pr20000605.html, LSI Logic Corporation, 2 pages (Jun. 5, 2000).

"MIPS32 Archtecture for Programmers vol. IV–a: The MIPS16e Application–Specific Extension to the MIPS32 Architecture," Document No. MD00076, Rev. 2.50, MIPS Technologies, Inc., Mountain View, California, 162 pages (Jul. 1, 2005).*

MIPS64 Architecture for Proammers vol. IV–a: The MIPS16e Application–Specific Extension to the MIPS64 Architecutre, Document No. MD00076, Rev. 2.50, MIPS Technologies, Inc., Mountain View, California, 210 pages (Jul. 1. 2005).*

Cobb, Paul, "TinyRISC: a MIPS–16 embedded CPU core," Presentation for Microprocssor Forum, 13 slides (7 pages) (Oct. 22–23, 1996).

U.S. Appl. No. 09/702,112, inventors Jensen, M., et al., filed Oct. 30, 2000 (not published) (67 pages).

U.S. Appl. No. 09/702,115, inventors Jensen, M., et al ., filed Oct. 30, 2000 (not published) (71 pages).

U.S. Appl. No. 10/066,475, inventor Edward Colles Nevill, filed Feb. 1, 2002 (based on U.S. Pat. No. , 6,021,265, issued Feb. 1, 2000) (9 pages).

Preliminary Amendment, filed Feb. 1, 2002, in U.S. Appl. No. 10/066,475, inventor Edward Colles Nevill, filed Feb. 1, 2002 (based on U.S. Pat. No. 6,021,265, issued Feb. 1, 2000) (15 pages).

Gwennap, Linley, "VLIW: The Wave of the Future?: Processor Design Style Could Be Faster, Cheaper Than RISC," Microprocessor Report vol. 8, No. 2, pp. 18–21 (Feb. 14, 1994).

Kurosawa, K., et al., "Instruction Architecture For A High Performance Integrated Prolog Processor IPP," Programming: Proceedings of the Fifth International Conference and Symposium (Aug. 15–19, 1988), MIT Press, Cambridge, MA, vol. 2, pp. 1506–1530 (1988).

IBM Technical Disclosure Bulletin, "Patchable Read–Only Storage and Other Patchable Functions," vol. 27, Issue 6, pp. 3496–3499 (Nov. 1, 1984) (4 pages).

IBM Technical Disclosure Bulletin, "Patch RAM Load Technique," vol. 27, Issue 6, pp. 3597–3598 (Nov. 1, 1984) (3 pages).

IBM Technical Disclosure Bulletin, "Micro scode Memory Changes," vol. 21, Issue 1, pp. 341–342 (Jun. 1, 1978) (3 pages).

NEC Data Sheet, MOS INtegrated Circuit, uPD30121, VR4121 64–/32–Bit Microprocessor (Copyright NEC Electronics Corporation 2000) (76 pages).

Ross, Roger, "There's no risk in the future for RISC," Computer Design, vol. 28, No. 22, pp. 73–75 (Nov. 13, 1989).

NEC User's Manual, VR4100 Series™, 64–/32–Bit Microprocessor Architecture, pp. 1–11 and 54–83 (Chapter 3) (Copyright NEC Corporation 2002).

Case, Brian, "ARM Architecture Offers High Code Density: Non–Traditional RISC Encodes Many Options in Each Instruction," Microprocessor Report, vol. 5, No. 23, pp. 11–14 (Dec. 18, 1991).

* cited by examiner

SYSTEM AND METHOD OF CONTROLLING SOFTWARE DECOMPRESSION THROUGH EXCEPTIONS

BACKGROUND OF THE INVENTION

1. Field of the Invention

The present invention relates generally to the field of microprocessors and more particularly to the use of modified microprocessor instructions to transform stored processor code.

2. Background Art

Single chip computers are used in a wide range of applications where their small size and processing power are an advantage over conventional systems. When designing a single chip computer, or modifying an existing system for a new application, the system designer must balance the space available on the silicon chip against the space required by the components necessary to provide the desired functionality. Adding components to the computer system such as additional memory or digital to analog converters will add functionality but also will take up valuable chip space. If the chip size is fixed and all available space is already being used, it will not be possible to add functionality without removing a component of equivalent size. Reducing the number of components reduces the required chip size but the number of components cannot be reduced below the minimum necessary for a functional computer.

One component that must be included in single chip computers is memory. The amount of memory required is a function of the complexity and execution speed desired for planned computer software applications. Larger and more complex software programs usually require more memory to properly execute, and more memory usually increases program execution speed.

One way to reduce the memory required in a single chip computer is to store the computer's software code in a compressed form. Compressing the code allows it to be stored in a smaller amount of memory and thereby reduces the computer system memory requirements. There are several available algorithms suitable for compressing computer code. However, since the processor cannot directly execute code stored in compressed form, a method of decompressing the code prior to its execution by the processor is needed. Existing techniques decompress large amounts of code such as a subroutine or large blocks of a main program before executing it. These techniques require the code decompression to occur either in the boot process or by some means external to the system processor. When the system processor is not used for decompression, additional hardware is necessary to accomplish the decompression. This makes it difficult and expensive to incorporate software compression in existing systems.

A further disadvantage to these techniques is the additional memory required to store the larger volume of decompressed code while it is waiting to be executed by the processor. This disadvantage reduces the memory savings originally achieved by compressing the code.

What is needed is a simple and effective method of manipulating and executing compressed computer code without the disadvantages discussed above.

BRIEF SUMMARY OF THE INVENTION

In a central processing unit, a method for transforming data into an instruction for execution by the central processing unit. The transformation is triggered by first receiving a misaligned instruction address, generating a hardware exception and then, in response to the exception, executing an exception handling routine that transforms the data into an instruction for the central processing unit.

An advantage of this invention is its use of existing exception handling hardware as a trigger for the data transformation. This allows the invention to be used in any system with exception handling hardware.

Another advantage of this method is that hardware data transformation triggers, such as special interrupts, are not necessary. The present invention gives control of the data transformation trigger to the software programmer vice the hardware designer. This improves the portability of the invention between different hardware platforms.

Additionally, this invention provides a flexible software tool for optimizing the quantity of data or code decompressed to the amount of memory available to store that data or code. Precise control of the code and data decompression enables the programmer to ensure his program will execute in the available memory and while taking advantage of the storage space reduction allowed by compression.

The foregoing and other features and advantages of the invention will be apparent from the following, more particular description of a preferred embodiment of the invention, as illustrated in the accompanying drawings.

BRIEF DESCRIPTION OF THE DRAWINGS/FIGURES

DETAILED DESCRIPTION OF THE INVENTION

The preferred embodiment of the invention is now described with reference to the figures where like reference numbers illustrate like elements. Furthermore, the left most digit of each reference number corresponds to the figure in which the reference number is first used. While specific methods and configurations are discussed, it should be understood that this is done for illustration purposes only. A person skilled in the art will recognize that other configurations and procedures may be used without departing from the spirit and scope of the invention.

Figure 1:
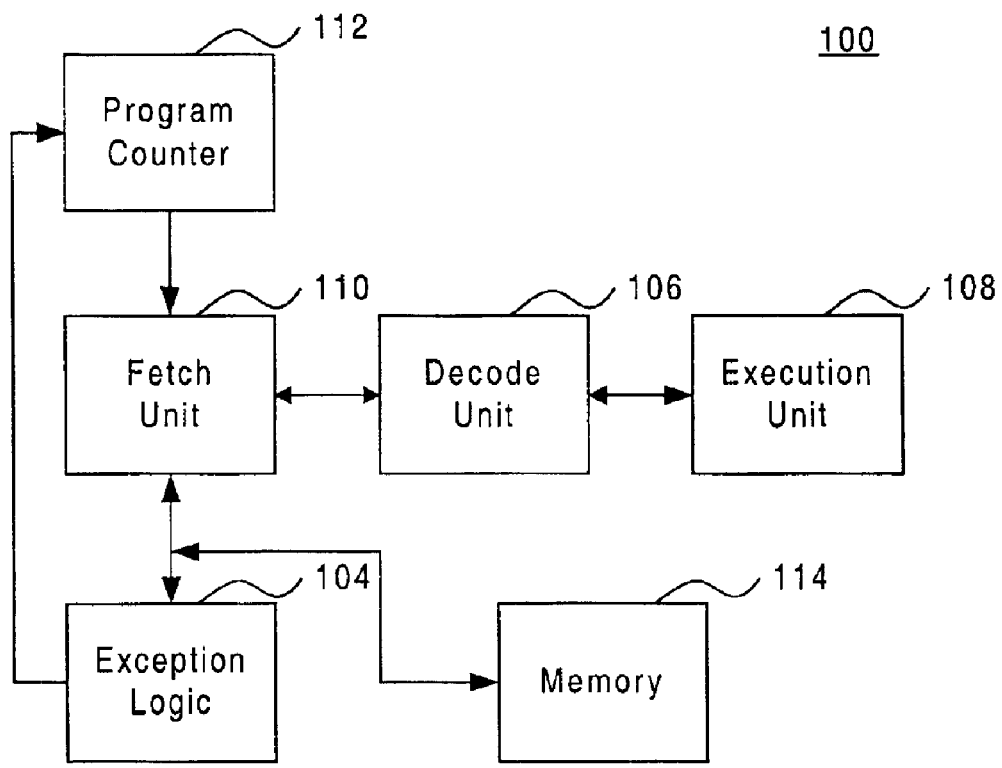
FIG. 1 illustrates a processor core embodiment of the invention.

Referring to FIG. 1, a block diagram of a processor core 100 is shown. Core 100 provides an example hardware environment for implementing an embodiment of the invention. A person skilled in the relevant art will recognize that the invention is not limited to application in this example environment. In fact, after reading the following description, it will become apparent to a person skilled in the relevant art how to implement the invention in alternative environments.

Core 100 includes a program counter 112 coupled to a fetch unit 110, a decode unit 106, an execution unit 108, exception logic 104 and memory 114. When an exception condition does not exist, core 100 operates as follows: fetch unit 110 retrieves data from an address in memory 114 specified by program counter 112. Decode unit 106 decodes the data into an instruction and sends it to execution unit 108 where it is executed.

Under certain conditions, such as a software error, program counter 112 will provide an address to fetch unit 110 which is not allowed or does not exist. When this occurs an exception is generated by decode logic 106 and the address that was used in the attempted fetch is sent to exception handling logic 104. Exception handling logic 104 performs the operations necessary to provide the address of a valid instruction to program counter 112 so that fetch unit 110 can retrieve an instruction and continue program execution.

The present invention uses exception logic 104, and a set of instructions known as an exception handling routine, to perform intentional, rather than error corrective, actions in response to software commands. In a preferred embodiment, processor instructions are stored in compressed form in memory 114. Before these instruction can be decoded by decode unit 106 they must be decompressed. The programmer responsible for implementing his program on a particular hardware suite determines the locations where compressed data will be stored in memory 114. He then configures software instructions to generate a misaligned address whenever processor instructions, stored in compressed form, are required for execution. The misaligned address is sent from program counter 112 to fetch unit 110 where it causes an exception error. The exception error causes core 100 to suspend its previous operation, and send the misaligned address to exception logic 104.

Exception logic 104 sets up core 100 to execute a set of processor instructions stored in memory 114. These instructions constitute the exception handling routine which functions to process the misaligned address and cause data to be transformed from a stored form into an executable instruction. The executable instruction is then stored in memory for use after the exception routine is complete. In an embodiment, the memory address containing the data to be transformed is offset by a known amount from the misaligned address provided by the programmer. The programmer sets up the exception handling routine to add this offset to the misaligned address and retrieve the data stored at the offset location. Another embodiment of the invention uses a misaligned instruction address as the data to be transformed. A further embodiment uses the misaligned address and a programmer generated lookup table to generate the memory address containing the compressed data.

After retrieving the stored data, the exception handling routine applies a transformative algorithm to the data. In one embodiment the transformation is a decompression algorithm. In other embodiments of the invention the programmer can select a number of transforming algorithms for implementation in the exception handling routine. A partial list of these algorithms are: decrypting an encrypted instruction, decoding a macro instruction, transforming a non-native instruction into a processor executable instruction and executing a random number of processor instructions. Based on the foregoing description, it will be apparent to a person skilled in the relevant art that other transformations can be implemented in accordance with the invention.

The retrieval, transformation and storage of processor instructions continue until the desired data has been transformed and stored in memory for subsequent execution by the processor.

When the data transformation is complete, the exception handling routine provides the address of the first transformed instruction to program counter 112, and returns core 100 to the pre-exception condition. Program counter 112 then provides fetch unit 110 with the address of the first transformed instruction which is decoded by decode unit 106 and executed by execution unit 108. Program execution continues as directed by the software program being executed.

Figure 2:
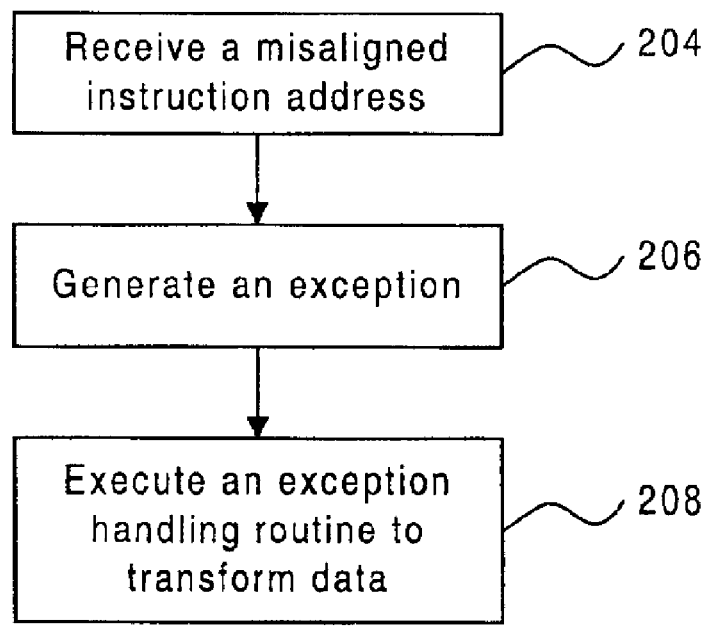
FIG. 2 illustrates a method for using an exception handling routine to transform data.

FIG. 2 illustrates a method of triggering data transformation according to the present invention. In step 204, a misaligned instruction address is received by fetch unit 110. As indicated by step 206, the misaligned instruction address causes an exception. Exception logic 104 then executes an exception handling routine to transform the data in a step 208.

Figure 3:
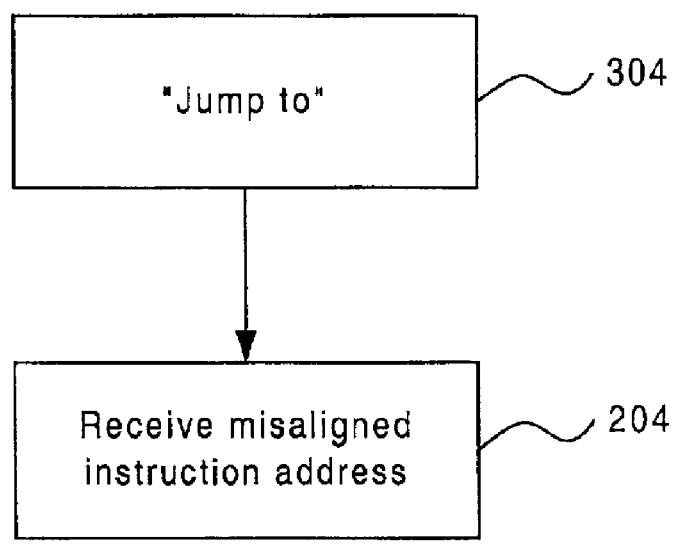
FIG. 3 illustrates additional details of receiving a misaligned instruction, step 204 of FIG. 2.

FIG. 3 describes step 204 in further detail. In step 304, a "jump to" instruction is executed causing fetch unit 110 to attempt to retrieve the next processor instruction from a specified "jump to" address. In a preferred embodiment of this invention the software programmer designates the jump address as an "odd" address, defined as an address with a least significant bit value of one. A core 100 with a 16 bit (4 bytes) address bus stores instructions at even byte boundaries in memory. In an embodiment, a misaligned instruction address is defined as an "odd" address. Therefore, fetch unit 110 receives a misaligned instruction address in a step 204. It will be apparent to a person skilled in the relevant art that other programming techniques can be used to cause the processor to receive a misaligned instruction address.

Figure 4:
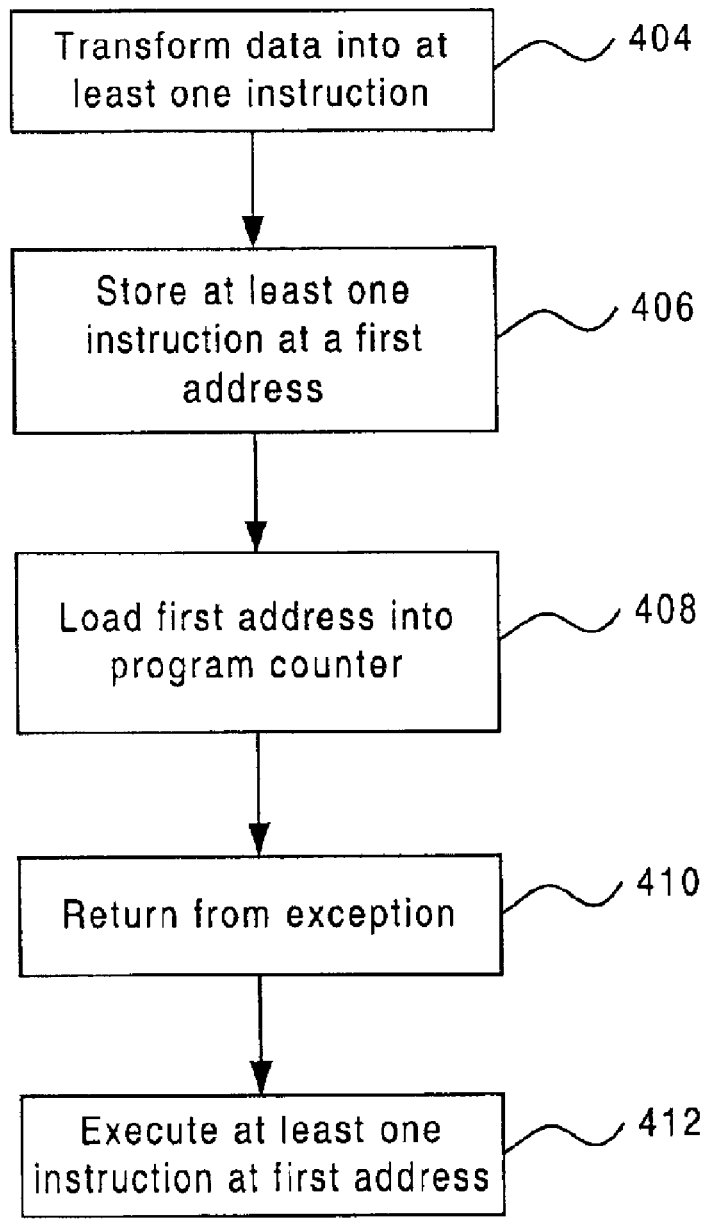
FIG. 4 illustrates details of an exception handling transform, step 208 of FIG. 2.

FIG. 4 describes step 208 in further detail. In a step 404, the misaligned data is transformed into at least one instruction. Step 404 continues until all data specified by the programmer is transformed. The first transformed instruction is stored at a first address in memory 114 in a step 406. The first address in memory 114, where the transformed instructions are stored, is then loaded into program counter 112 in a step 408. A return from exception is executed, in a step 410, to return core 100 to its pre-exception mode of operation. Fetch unit 110 then retrieves a transformed instruction (starting with the address indicated by program counter 112) for execution as indicated by step 412.

Figure 5:
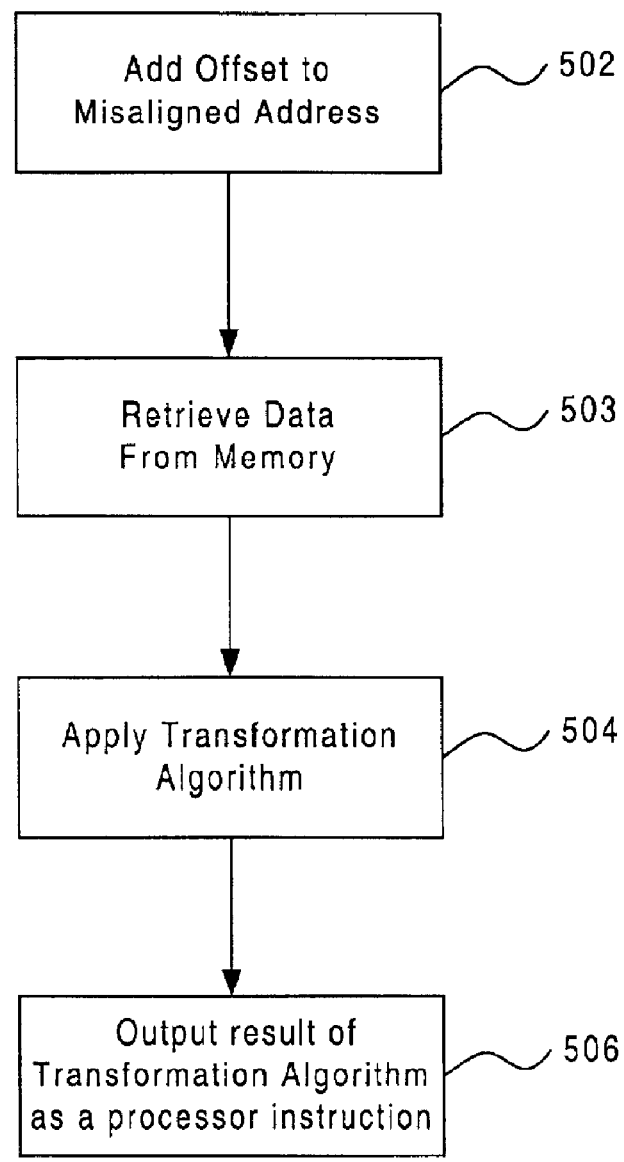
FIG. 5 illustrates details of transforming data into an instruction, step 404 of FIG. 4.

Step 404 is described in further detail with reference to FIG. 5. In a step 502 an offset value is added to the misaligned instruction address. Data stored at the address defined by the addition of the offset value and the misaligned instruction address is retrieved in a step 503. A transformative algorithm is then applied to the retrieved data in a step 504. The result of the transformation is designated a processor instruction in a step 506.

Example Exception Handling Routine

When an exception is triggered the core 100 automatically executes a set of instructions known as an exception handling routine. An example of the software code embodying an exception handling routine is provided below. Additional information on programming exception handling routines is found in, Dominic Sweetman, *See MIPS Run* (1999), which is incorporated herein by reference in its entirety. Although this reference is for a particular hardware set, persons of skill in the art will understand how to implement the present invention on other hardware platforms.

The example routine is written in a C language format pseudocode. This code is for illustrating the basic operation of an exception handling routine and cannot be compiled.

```
/* The hardware exception logic transfers program execution to a preprogrammed
address where a software exception handler is stored. For this example the
exception handler is called Exception_handler. The bad address is data that caused
a hardware exception condition in the core 100.
*/
Execption_handler( )
{
    /* Check to see if this is an exception for a bad address.
    */
    if (conduct hardware dependent check for bad address);
    {
        /*
        The hardware exception logic passes the bad address to the
        software exception handler (the detailed method is hardware
        dependent). The software exception handler uses the bad address
        to determine if the exception is a decode trigger or an actual bad
        address. To do this the hardware may have a list of valid addresses
        that are acceptable or a range of addresses that are acceptable or just
        check to see if it is a odd address (lowest order address bit set).
        */
        if (valid decode address);
        {
            /*
            If the software exception handler determines the cause of
            the exception is a purposeful decode trigger, it may use
            the bad address to determine where the encoded data is
            stored and decode that encoded data into a location in
            memory from which it can later be executed. If a
            transformation of the data is desired, a function, decode,
            is called to perform that function. The decode function will
            decide when to stop decoding. For example if this were a
            program instruction, being decoded, a good stopping point
            would be the next branch instruction. The decode function
            will return a value, decode_return. This value could
            represent an address of a decoded section of code that the
            core 100 can use to continue execution after it leaves the
            decode function or as an address where the newly decoded
            data is stored.
            */
            decode_return = decode(bad_address)
            /*
            What the software exception handler does depends on
            what was decoded. For this example, if the decoder
            decoded compressed instructions and the decode_return
            value was the address of the first instruction of a block of
            instructions that were decoded. The decode function will
            need to "fix" the address so the core 100 will know where
            to begin execution after the exception handling function
            finishes. In many core 100 designs there is a register in the
            core 100 called a program counter 112 which is the address
            the core 100 uses to fetch the current instruction or the
            next instruction that will be executed. The program
            counter 112 may still contain the bad address that caused
            the exception. This address needs to be changed to the
            address of the decompressed code so the core 100 will
            begin executing the decompressed code.
            */
            fix_program_counter(decode_return);
        }
        else
        {
            /*
            If this was not a valid decode address or exception then
            the exception function will continue here with logic to
            process the exception.
            /*
        }
    }
    else
    {
        /*
        Check for other exceptions
        */
    }
    /*
```

```
At this point the exception function will do any addition housekeeping
that is need for the particular core 100 architecture and return.
*/
    return;
}
```

Figure 6:
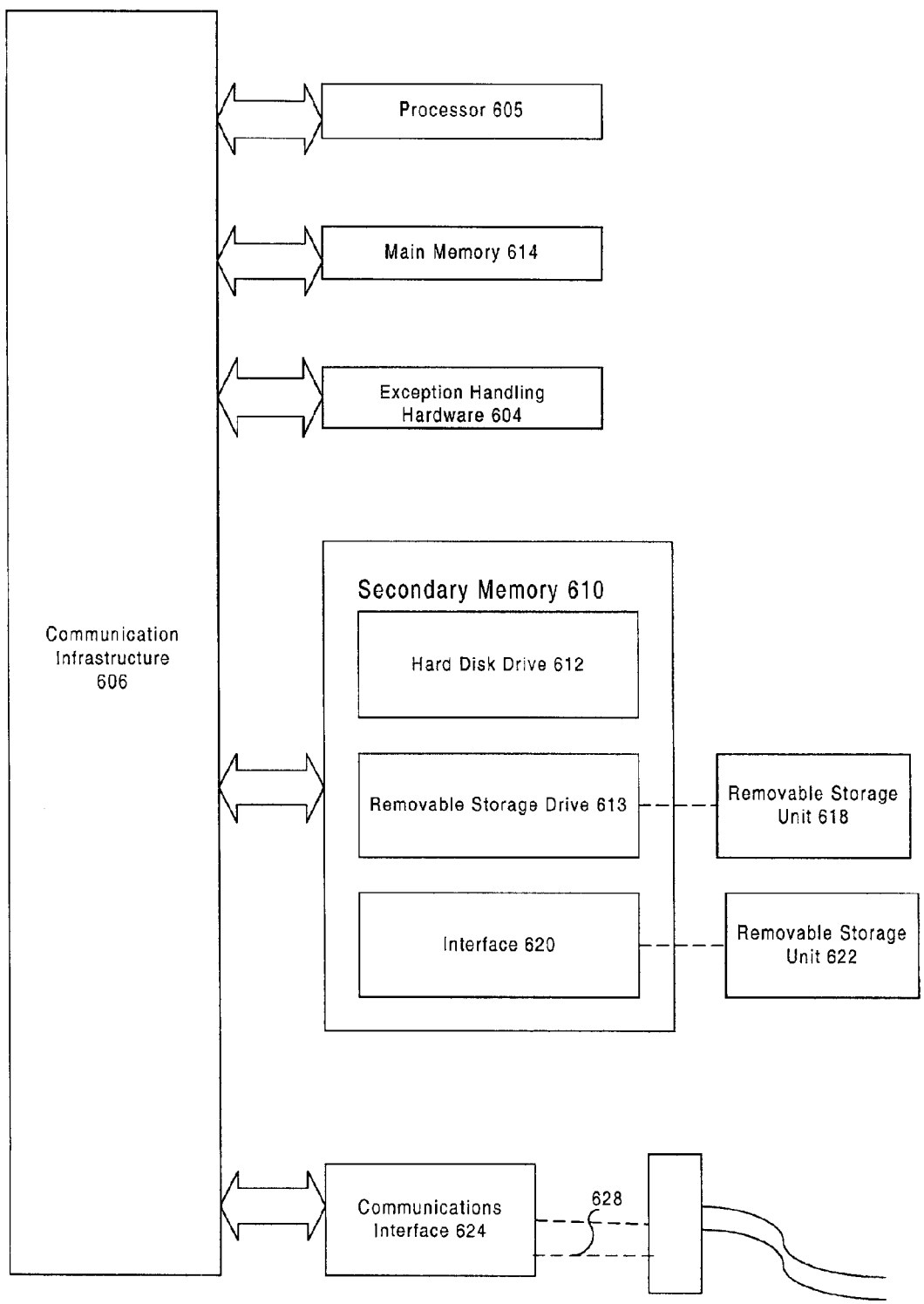
FIG. 6 illustrates a computer system embodiment of the invention.

The invention can be implemented in a computer system capable of carrying out the functionality described herein. An example of a computer system 600 is shown in FIG. 6. Various software embodiments are described in terms of this example computer system. After reading this description, it will become apparent to a person skilled in the relevant art how to implement the invention using other computer systems and/or computer architectures. Computer system 600 includes one or more processors, such as processor 605. Processor 605 is connected to a communication bus 606.

Computer system 600 also includes exception handling hardware 604, a main memory 614, preferably random access memory (RAM), and may also include a secondary memory 610. The secondary memory 610 may include, for example, a hard disk drive 612 and/or a removable storage drive 613, representing a floppy disk drive, a magnetic tape drive, an optical disk drive, etc. The removable storage drive 613 reads from and/or writes to a removable storage unit 618 in a well-known manner. Removable storage unit 618, represents a floppy disk, magnetic tape, optical disk, etc. which is read by and written to by removable storage drive 613. As will be appreciated, the removable storage unit 618 includes a computer usable storage medium having stored therein computer software and/or data.

Secondary memory 610 may include similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, a phone line, a cellular phone link, an RF link, and other communications channels.

Computer programs (also called computer control logic) are stored in main memory 614 and/or secondary memory 610. Computer programs may also be received via communications interface 624. Such computer programs, when executed, enable the computer system 600 to perform the features of the present invention as discussed herein. In particular, the computer programs, when executed, enable the processor 605 to perform the features of the present invention. Accordingly, such computer programs represent controllers of the computer system 600.

In some embodiments in which the invention is implemented using software, the software may be stored as computer program product and loaded into computer system 600 using removable storage drive 613, hard drive 612 or communications interface 624. The control logic (software), when executed by the processor 605, causes the processor 605 to perform the functions of the invention as described herein.

In other embodiments, the invention is implemented primarily in hardware using, for example, hardware components such as application specific integrated circuits (ASICs). Implementation of the hardware state machine so as to perform the functions described herein will be apparent to persons skilled in the relevant art(s).

In further embodiments the invention is implemented using a combination of hardware and software.

The invention can be implemented in software that describes hardware and is disposed, for example, in a computer usable (i.e., readable) medium configured to store the software (i.e., a computer readable program code). The program code causes the enablement of the functions or fabrication (or both) of the systems and techniques described above. This may be accomplished, for example, through the use of general programming language (e.g., C, C++), hardware description language (HDL) including Verilog HDL, VHDL and so on, or other available programming and/or circuit (i.e., schematic) capture tools. The program code may be disposed in any known computer medium including semiconductor, magnetic disk, optical disc (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits.

While a preferred and alternate embodiments of the present invention have been described above, it should be understood that it is presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for generating at least one instruction for execution by a central processing unit, the method comprising the steps of:

receiving a misaligned instruction address;
causing an exception in response to said misaligned instruction address; and
executing, in response to said exception, an exception handling routine that includes the steps of
transforming data into at least one instruction for execution by the central processing unit,
storing said at least one instruction into memory at a first address,
loading said first address into a program counter register of said central processing unit, and
returning from execution of said exception handling routine to execute said at least one instruction stored at said first address.

2. The method of claim 1, wherein said executing step comprises the step of:
using said misaligned instruction address to form said at least one instruction.

3. The method of claim 1, wherein said executing step further comprises a step prior to said returning step of:
performing the operations necessary to clear an exception flag and put said central processing unit into its previous execution mode.

4. The method of claim 1, wherein said executing step further comprises:
transforming said misaligned instruction address into an address where data is stored.

5. The method of claim 1, wherein said transforming data step is selected from the group consisting of: decompressing a compressed instruction, decrypting an encrypted instruction, decoding a macro instruction, and transforming a non-native instruction into said at least one instruction.

6. The method of claim 4, wherein said transforming said misaligned instruction address step is selected from the group consisting of: using the misaligned instruction address, adding an offset to the misaligned instruction address and using a lookup table.

7. A computer readable medium having digital information stored thereon, the digital information defining executable computer program logic, wherein the executable computer program logic, when executed, causes a processor to perform the steps of:
receiving a misaligned instruction address;
generating an exception; and
executing, in response to said exception, an exception handling routine that includes the steps of
transforming data into at least one instruction,
storing said at least one instruction into memory at a first address,
loading said first address into a program counter register of said processor, and
returning from execution of said exception handling routine to execute said at least one instruction stored at said first address.

8. The computer readable medium of claim 7, wherein said executing step comprises the step of:
using said misaligned instruction address to form said at least one instruction.

9. The computer readable medium of claim 7, wherein said executing step further comprises a step prior to said returning step of:
performing the operations necessary to clear an exception flag and put said processor into its previous execution mode.

10. The computer readable medium of claim 7, wherein said executing step further comprises:
transforming said misaligned instruction address into an address where data is stored.

11. The computer readable medium of claim 10, wherein said transforming said misaligned instruction address step is selected from the group consisting of: using the misaligned instruction address, adding an offset to the misaligned instruction address, and using a lookup table.

12. The computer readable medium of claim 7, wherein said transforming data step is selected from the group consisting of: decompressing a compressed instruction, decrypting an encrypted instruction, decoding a macro instruction, and transforming a non-native instruction into said at least one instruction.

13. An apparatus for generating valid processor instructions, comprising:
means for receiving a misaligned instruction address;
means for generating an exception in response to said misaligned instruction address;
means for transforming data into at least one instruction in response to said exception;
means for storing said at least one instruction into memory at a first address;
means for loading said first address into a program counter register of a processor; and
means for returning from execution of an exception handling routine to execute said at least one instruction stored at said first address.

14. The apparatus of claim 13, wherein said transforming data means comprises:
means for using said misaligned instruction address to form said at least one instruction.

15. The apparatus of claim 13, where wherein said transforming data means comprises:
means for transforming said misaligned instruction address into a memory address and for using said memory address to fetch said at least one instruction from memory.

16. The apparatus of claim 13, wherein said transforming data means decompresses a compressed instruction.

17. The apparatus of claim 13, wherein said transforming data means decrypts an encrypted instruction.

18. The apparatus of claim 13, wherein said transforming data means decodes a macro instruction.

19. The apparatus of claim 13, wherein said transforming data means transforms a non-native instruction into said at least one instruction.

20. A computer system, comprising:
a processor;
a memory, coupled to said processor; and
sequences of instructions stored in said memory which, when executed, cause said processor to:
execute an exception handling routine in response to a misaligned instruction address that
transforms data stored in said memory into at least one instruction,
stores said at least one instruction into said memory at a first address,
loads said first address into a program counter register of said processor, and
returns from execution of said exception handling routine to execute said at least one instruction stored at said first address.

21. The computer system of claim 20, wherein said data is transformed into at least one instruction by decompressing a compressed instruction.

22. The computer system of claim 20, wherein said data is transformed into at least one instruction by decrypting an encrypted instruction.

23. The computer system of claim 20, wherein said data is transformed into at least one instruction by decoding a macro instruction.

24. The computer system of claim 20, wherein said data is transformed into at least one instruction by transforming a non-native instruction into said at least one instruction.

* * * * *